(12) United States Patent
Wu

(10) Patent No.: US 9,226,187 B2
(45) Date of Patent: *Dec. 29, 2015

(54) METHOD FOR REPORTING MDT LOG, NETWORK SERVER, AND MOBILE COMMUNICATION DEVICE UTILIZING THE SAME

(71) Applicant: HTC Corporation, Taoyuan, Taoyuan County (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 87 days.

This patent is subject to a terminal disclaimer.

(21) Appl. No.: 14/030,649

(22) Filed: Sep. 18, 2013

(65) Prior Publication Data
US 2014/0016566 A1    Jan. 16, 2014

Related U.S. Application Data

(63) Continuation of application No. 13/159,269, filed on Jun. 13, 2011, now Pat. No. 8,594,657.

(60) Provisional application No. 61/354,966, filed on Jun. 15, 2010, provisional application No. 61/377,994, filed on Aug. 30, 2010, provisional application No. 61/378,400, filed on Aug. 31, 2010.

(51) Int. Cl.
*H04W 4/00* (2009.01)
*H04W 36/00* (2009.01)
(Continued)

(52) U.S. Cl.
CPC ........... *H04W 24/10* (2013.01); *H04L 12/2697* (2013.01); *H04L 43/50* (2013.01);
(Continued)

(58) Field of Classification Search
CPC ..... H04W 36/02; H04W 36/30; H04W 36/00; H04W 36/24; H04W 48/16
USPC ................... 455/436, 423, 455, 464; 370/331
See application file for complete search history.

(56) References Cited

U.S. PATENT DOCUMENTS

| 2005/0018624 | A1 | 1/2005 | Meier et al. |
| 2006/0276188 | A1 | 12/2006 | Pekonen et al. |

(Continued)

FOREIGN PATENT DOCUMENTS

| JP | 2007-336225 A | 12/2007 |
| JP | 2010-050694 A | 3/2010 |

(Continued)

OTHER PUBLICATIONS

3GPP TSG-RAN WG2, R2-105311, Oct. 2010.*
(Continued)

*Primary Examiner* — William Nealon
(74) *Attorney, Agent, or Firm* — Birch, Stewart, Kolasch & Birch, LLP

(57) ABSTRACT

Methods, network server, and mobile communication devices for reporting an MDT log are provided. The method, adopted by a network server, requesting a Minimization of Drive Test (MDT) log from a mobile communication device is disclosed, including: transmitting a first request message for the MDT log to the mobile communication device; in response to the first request message, receiving a first response message comprising a part of the MDT log from the mobile communication device, wherein the first response message indicates whether the MDT log reporting is finished or whether at least one more part of the MDT log is available; and transmitting a second request message for the MDT log to the mobile communication device when the first response message indicates that the MDT log reporting is not finished or at least one more part of the MDT log is available.

19 Claims, 13 Drawing Sheets

(51) Int. Cl.
  *H04W 24/10* (2009.01)
  *H04W 36/02* (2009.01)
  *H04L 12/26* (2006.01)
  *H04W 24/08* (2009.01)
  *H04W 36/08* (2009.01)
  *H04W 72/12* (2009.01)
  *H04W 88/02* (2009.01)

(52) U.S. Cl.
  CPC .............. *H04W 24/08* (2013.01); *H04W 36/02* (2013.01); *H04W 36/08* (2013.01); *H04W 72/1242* (2013.01); *H04W 88/02* (2013.01)

(56) References Cited

U.S. PATENT DOCUMENTS

| | | |
|---|---|---|
| 2007/0129088 A1* | 6/2007 | Gao et al. ..................... 455/464 |
| 2007/0207814 A1 | 9/2007 | Usuda et al. |
| 2007/0293226 A1 | 12/2007 | Lee et al. |
| 2009/0144340 A1 | 6/2009 | Ferguson et al. |
| 2009/0257353 A1 | 10/2009 | Song et al. |
| 2010/0003981 A1 | 1/2010 | Ahluwalia |
| 2010/0003982 A1 | 1/2010 | Somasundaram et al. |
| 2010/0054214 A1 | 3/2010 | Igarashi et al. |
| 2010/0285806 A1 | 11/2010 | Iwamura |
| 2011/0116470 A1* | 5/2011 | Arora et al. .................. 370/331 |
| 2011/0319070 A1* | 12/2011 | Nosley et al. .............. 455/422.1 |

FOREIGN PATENT DOCUMENTS

| | | |
|---|---|---|
| JP | 2010-062743 A | 3/2010 |
| WO | WO 2011/160274 A1 | 12/2011 |
| WO | WO 2012/021003 A2 | 2/2012 |
| WO | WO 2012/047025 A2 | 4/2012 |

OTHER PUBLICATIONS

3GPP, TS37.320 V0.7.0, Jun. 2010.*
3GPP TS 25.331 V9.1.0 (Dec. 2009), 3rd Generation Partnership Project; Technical Specification Group Radio Access Network; Radio Resource Controll (RRC); Protocol specification (Release 9).
3GPP TS 36.331 V9.1.0 (Dec. 2009), 3rd Generation Partnership Project; Technical Specification Group Radio Access Network: Evolved Universal Terrestrial Radio Access (E-UTRA); Radio Resource Control (RRC); Protocol specification (Release 9).
3GPP TS 37.320 V0.5.0 (May 2010), 3rd Generation Partnership Project; Techical Specification Group TSG RAN Universal Terrestrial Radio Access (UTRA) and evolved Universal Terrestrial Radio Access (E-UTRA); Radio measurement collection for Minimization of Drive Tests (MDT); Overall description; Stage 2 (Release 10).
3GPP TS 37.320, "3rd Generation Partnership Project; Technical Specification Group TSG RAN Universal Terrestrial Radio Access (UTRA) and Evolved Universal Terrestrial radio Access (E-UTRA); Radio Measurement Collection . . . " V0.5.0, May 2010, 13 pages, XP050423423.
3GPP TSG RAN WG2 #70; May 10-14, 2010, Montreal, Canada; 4.3.1; Samsung; Configuration handling for logged MDT; Discussion; pp. 1-3.
3GPP TSG RAN WG2 #70; May 10-14, 2010, Montreal, Canada: Samsung; "Configuration handling for logged MDT"; R2-102783; XP050423127; 3 pages.
3GPP TSG-RAN WG2 #70; May 10-14, 2010, Montreal, Canada; NTT DOCOMO, Inc., MDT support for roaming and network sharing scenarios; Discussion; 4.3.1.4; pp. 1-4.
3GPP TSG-RAN WG2 #70; May 10-14, 2010, Montreal, Canada; R2-102997; NTT DOCOMO, Inc.; "MDT support for roaming and network sharing scenarios"; XP050423216; 4 pages.
CATT, "Handling of the Log Available Indication," 3GPP TSG WG2 Meeting #70, R2-102793, Montreal, Canada, May 10-14, 2010, 2 pages, XP050423135.
Nokia Corporation, Nokia Siemens Networks, "MDT Architecture for Connected Mode Reporting," 3GPP TSG-RAN WG2 Meeting #69, R2-100247, San Francisco, United States, Feb. 22-26, 2010, 3 pages, XP050421728.
Nokia Corporation, Nokia Siemens Networks, "MDT Architecture for Idle Mode Reporting," 3GPP TSG-RAN WG2 Meeting #69, R2-100245, San Francisco, United States, Feb. 22-26, 2010, 5 pages, XP050421727.
Email discussion rapporteur (Qualcomm Incorporated), "MDT considerations", 3GPP TSG-RAN WG2 meeting #68bis, R2-10XXXX, Feb. 22-26, 2010, 10 pgs.
HTC: "Logged MDT reporting", 3GPP TSG-RAN WG2 #71bis, R2-105311, Oct. 15-19, 2010, Xian, China, Mobile Competence Centre, France, vol. RAN WG2, No. Xi'an; Oct. 5, 2010, XP050452575, pp. 1-2.

* cited by examiner

US 9,226,187 B2

METHOD FOR REPORTING MDT LOG, NETWORK SERVER, AND MOBILE COMMUNICATION DEVICE UTILIZING THE SAME

CROSS REFERENCE TO RELATED APPLICATIONS

This Application is a Continuation of U.S. patent application Ser. No. 13/159,269, which claims priority of U.S. Provisional Applications No. 61/354,966, filed on Jun. 15, 2010, No. 61/377,994, filed on Aug. 30, 2010, and No. 61/378,400, filed on Aug. 31, 2010, the entirety of which are incorporated by reference herein.

BACKGROUND OF THE INVENTION

1. Field of the Invention

The present invention relates to Minimization of Device Test (MDT), and in particular relates to methods and mobile communication devices for reporting an MDT log.

2. Description of the Related Art

In a typical mobile communication environment, a user equipment (UE) may communicate voice and/or data signals with one or more service networks via cellular stations of the service networks. The wireless communications between the UE and the service networks may be in compliance with various wireless technologies, such as the Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

An MDT is a collection of measurements and data logging activities performed by a user equipment to replace the manual drive testing that operators have to perform in a telecommunication network. The MDT evaluates network performance per physical location, and is applicable in various telecommunication systems such as the High Speed Packet Access (HSPA) and LTE systems. A method and communication device for reporting an MDT log in the applicable telecommunication system is thus required.

BRIEF SUMMARY OF THE INVENTION

A detailed description is given in the following embodiments with reference to the accompanying drawings.

An embodiment of a method, adopted by a network server, requesting a Minimization of Drive Test (MDT) log from a mobile communication device is disclosed, comprising: transmitting a first request message for the MDT log to the mobile communication device; in response to the first request message, receiving a first response message comprising a part of the MDT log from the mobile communication device, wherein the first response message indicates whether the MDT log reporting is finished or whether at least one more part of the MDT log is available; and transmitting a second request message for the MDT log to the mobile communication device when the first response message indicates that the MDT log reporting is not finished or at least one more part of the MDT log is available.

Another embodiment of a network server requesting a MDT log from a mobile communication device is disclosed. The network server comprises a server transceiver and a server controller. The server transceiver is configured to transmit a first request message for the MDT log to the mobile communication device; and in response to the first request message, receive a first response message comprising a part of the MDT log from the mobile communication device, wherein the first response message indicates whether the MDT log reporting is finished or whether at least one more part of the MDT log is available. The server controller, coupled to the server transceiver, is configured to determine that the MDT log reporting is not finished or at least one more part of the MDT log is available based on the first response message. The server transceiver is further configured to transmit a second request message for the MDT log to the mobile communication device when the MDT log reporting is not finished or at least one more part of the MDT log is available.

Another embodiment of mobile communication device providing a MDT log to a network server is disclosed. The mobile communication device comprises a client transceiver and a client controller. The client transceiver is configured to receive a first request message for the MDT log from the network server; and in response to the first request message, transmit a first response message comprising a part of the MDT log to the network server, wherein the first response message indicates whether the MDT log reporting is finished or whether at least one more part of the MDT log is available. The client controller, coupled to the client transceiver, is configured to determine that the MDT log reporting is not finished or at least one more part of the MDT log is available based on the first response message. The client transceiver is further configured to receive a second request message for the MDT log from the network server when the MDT log reporting is not finished or at least one more part of the MDT log is available.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
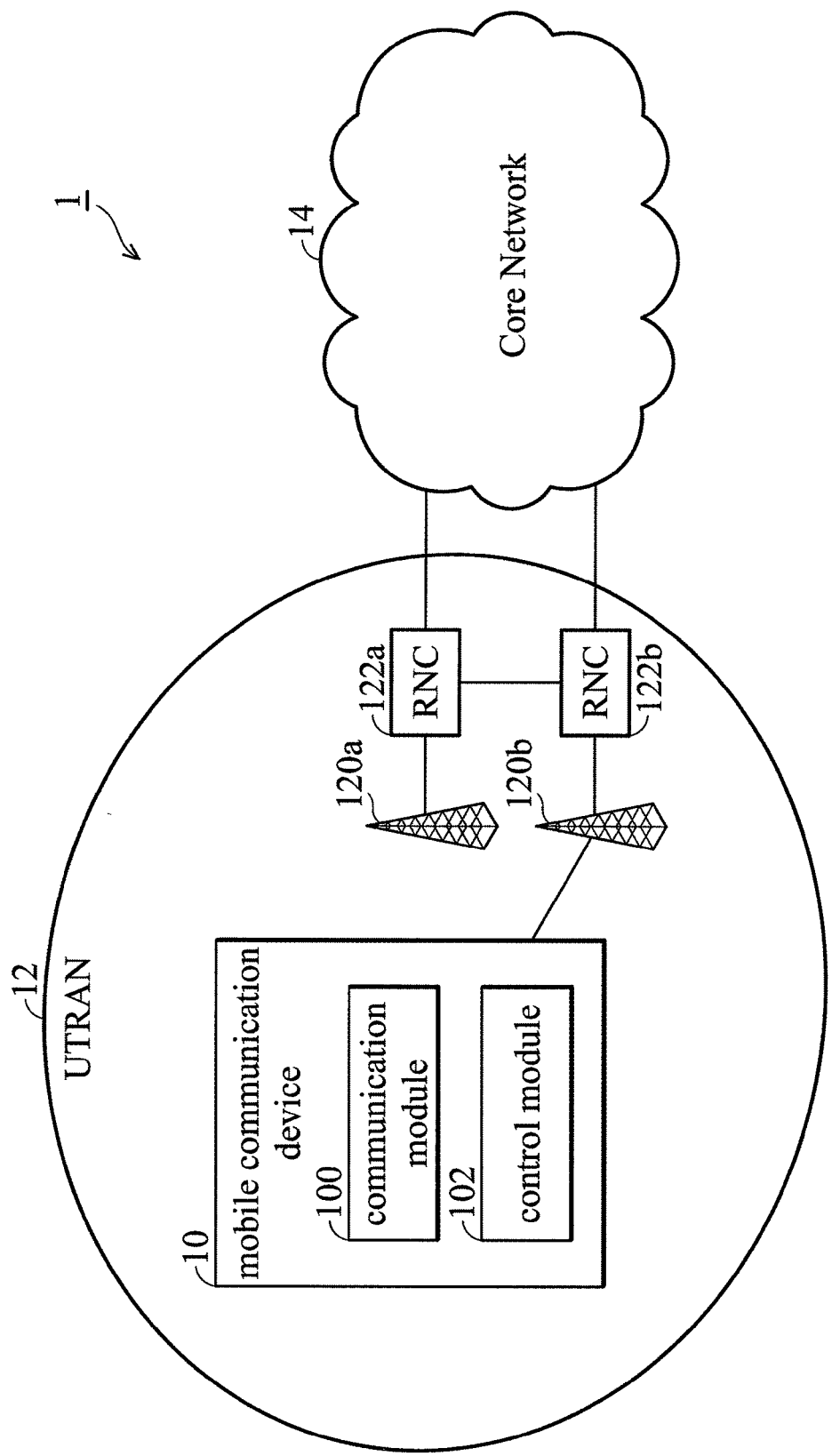
FIG. 1 is a block diagram illustrating a mobile communication environment according to an embodiment of the invention.

FIG. 1 is a block diagram illustrating a mobile communication environment according to an embodiment of the invention. The mobile communication environment 1 is a Universal Mobile Telecommunication System (UMTS) network comprising an UMTS Terrestrial Radio Access Network (UTRAN) 12 and the core network 14, where the UTRAN 12 comprises Node B base stations 120a and 120b, and radio network controllers (RNC) 122a and 122b. Each Node B is coupled to a plurality of antennas (not shown), each antenna thereof provides a radio coverage covering a specific area or for a specific network operator, and is referred to as a cell herein. In the UMTS network, a mobile communication device 10 is in connection with Node B 120a or 120b through a radio Uu interface based on the WCDMA technology, which in turn is coupled to the RNCs 122a or 122b through Iu interfaces based on the ATM technology, where an Iub interface is utilized between a nodeB base station and a RNC, and an Iur interface is utilized between RNCs. The cell providing radio connection between the UTRAN 12 and the mobile communication device 10 is referred to as a serving cell, and the RNC in charge of an RRC connection between the mobile communication device 10 and the UTRAN 12 is known as a serving RNC (SRNC). The RNCs 122a and 122b are further coupled to the core network 14 through IuCS and IuPS interfaces to access circuit-switched (CS) services and packet-switched (PS) services respectively. The Core Network (CN) 14 consists of two service domains including the CS service domain interfacing with CS based network such as Public Switched Telephone Network (PSTN) or Integrated Services Digital Network (ISDN) and the PS service domain interfacing with Internet Protocol (IP) based Network such as the Internet.

Figure 2:
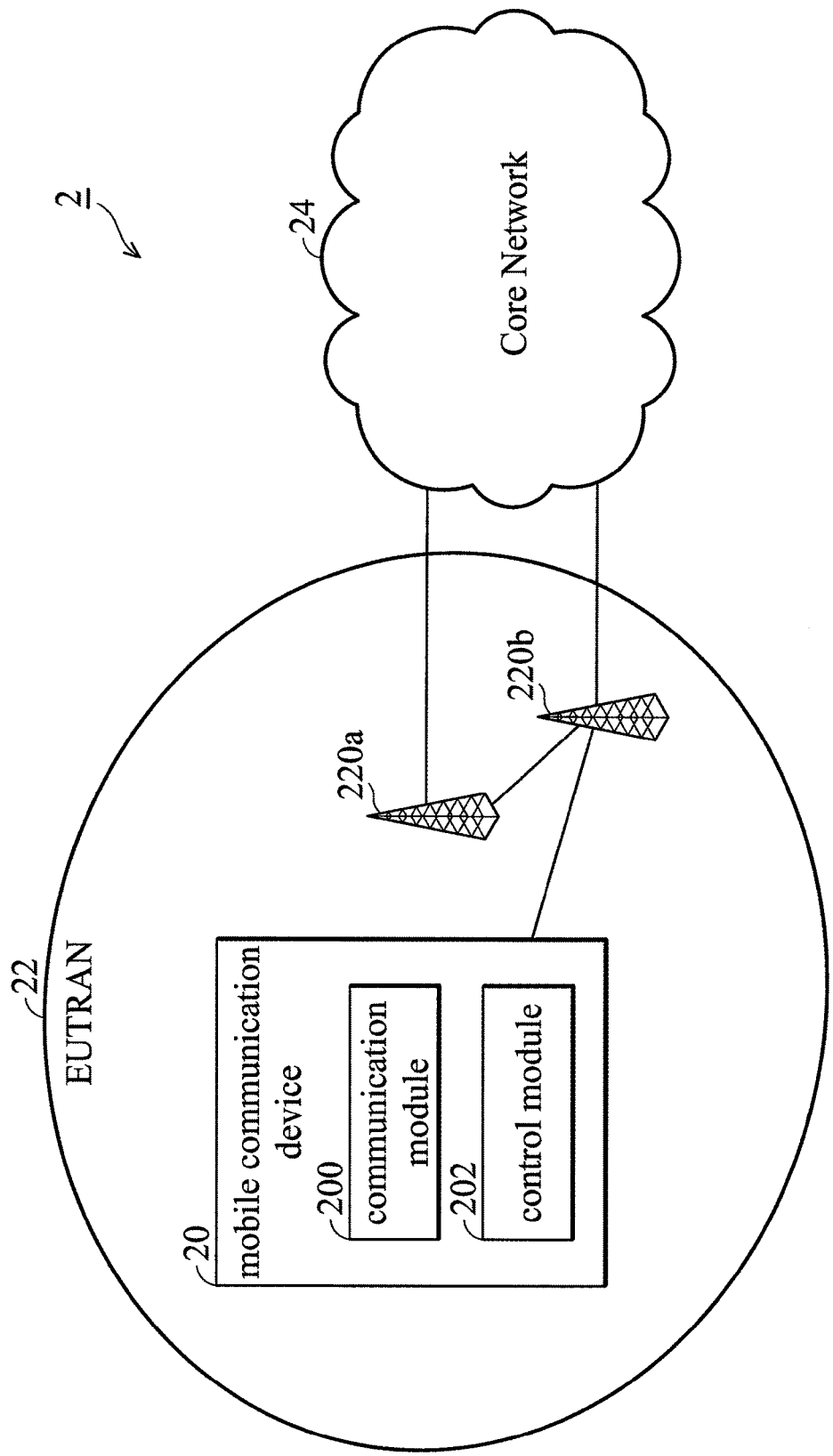
FIG. 2 is a block diagram illustrating another mobile communication environment according to an embodiment of the invention.

FIG. 2 is a block diagram illustrating another mobile communication environment according to an embodiment of the invention. The mobile communication environment 2 is an LTE system comprising an Evolved UTRAN (EUTRAN) 22 and a core network 24. The EUTRAN 22 comprises Evolved Node Bs (eNB) 220a and 220b which communicate to each other through an X2 interface, and are coupled to the core network 24 through an S1 interface. A mobile communication device 20 is in connection with the eNB 220a or 220b. The core network 24 comprises only PS service domain in the LTE system. Each eNB is coupled to a plurality of antennas responsible for providing a radio coverage covering a specific area or for a specific network operator. The cell directly in connection with the mobile communication device 20 is referred to as a serving cell.

The mobile communication device 10 in FIG. 1 and the mobile communication device 20 in FIG. 2 are any device used for the communication, e.g., handhold mobile phones, laptop determiners equipped with broadband network adaptors, or any other device capable of communicating. The mobile communication device 10 comprises a control module 102 and a communication module 100, and the mobile communication device 20 comprises a control module 202 and a communication module 200. The control modules 102 and 202 may comprise hardware to perform baseband signal processing including digital signal processing, coding and decoding, and so on. The communication modules 100 and 200 may comprise hardware to perform analog to digital conversion (ADC), digital to analog conversion (DAC), gain adjusting, modulation, demodulation, and so on. The communication modules 100 and 200 may receive RF signals from the Node B 120 and eNB 220 respectively and down-convert the received RF signals to baseband signals to be processed by the control modules 102 and 202 respectively, or receive baseband signals from the control modules 102 and 202 respectively and up-convert the received baseband signals to RF signals for uplink transmission. The radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. The control modules 102 and 202 control the operation of the communication modules 100 and 200 respectively, and other functional components, such as a display unit and/or keypad serving as an MMI (man-machine interface), a storage unit storing the program codes of applications or technologies, or others. The mobile communication device 10 is a UE in compliance with the 3GPP TS 25.331 specification and other related specifications of the WCDMA technology, and the mobile communication device 20 is a UE in compliance with 3GPP TS 36.331 specification and other related specifications of the LTE technology, and the invention is not limited thereto.

Figure 3:
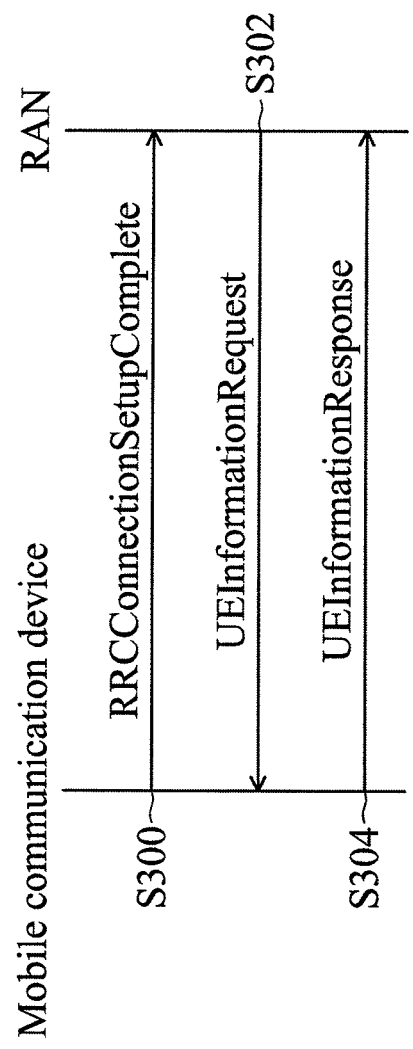
FIG. 3 is a message sequence chart for conventional MDT log reporting.

The MDT comprises two types, namely, an Immediate MDT and a Logged MDT. The Immediate MDT is a functionality involving measurements performed by a mobile communication device in a CONNECTED state and reporting of the measurements to an eNB/RNC available at the time of the reporting condition. The Logged MDT is a functionality involving measurements performed by a mobile communication device in an IDLE state at points in time when configured conditions are satisfied, wherein the collected measurements (also called MDT measurements hereafter) are stored in a measurement log (also called MDT log hereafter) for reporting to an eNB/RNC at a later point in time. The MDT log may contain one MDT measurement or a plurality of MDT measurements. The mobile communication device (10 or 20) is configured with a Logged MDT configuration in the CONNECTED state to perform Logged MDT measurements in the IDLE state. The mobile communication device (10 or 20) collects MDT measurements which are measured results for the serving cell and neighbor cells and keeps the MDT measurements in its memory component. The mobile communication device (10 or 20) indicates the availability of the MDT log by means of a one bit indicator in an RRCConnectionSetupComplete message during connection establishment, as shown in FIG. 3, which is a message sequence chart for conventional MDT log reporting. Upon completion of an RRC connection establishment procedure, the mobile communication device indicates the availability of the MDT log in the RRCConnectionSetupComplete message (S300). The indicator may also be provided during a handover procedure, a re-establishment procedure, and an UTRAN SRNC relocation procedure that involves a change from one serving RNC to another. In all cases, the mobile communication device includes the indication even though the logging period may not have ended. The RAN can decide to retrieve the MDT log based on the indication. In the case where the MDT log is retrieved before the completion of the pre-defined logging duration, the MDT log can be deleted, but the Logged MDT measurement continues according to the Logged MDT configuration. The MDT log reporting is triggered by an on-demand mechanism, i.e. the mobile communication device is requested by the network to send the MDT log thereto via RRC signaling e.g., UEInformationRequest message (S302). In response to the MDT log request in the UEInformationRequest message, the mobile communication device returns the MDT log in the UEInformationResponse message to the serving cell via Signaling Radio Bearer SRB2 in the LTE network and via Signaling Radio Bearer SRB3 or SRB4 in the UMTS network (S304). The reporting may occur in different cells other than the cell for which the Logged MDT configuration is signaled. The MDT log includes MDT measurements for the serving cell (e.g. the measurement quantity) and available UE measurements performed in idle for intra-frequency/inter-frequency/inter-RAT, time stamps and location information. The location information is based on available location information in the mobile communication device. Thus, the Logged MDT measurements are tagged by the mobile communication device with location data that includes an ECGI of the serving cell when the measurement was taken, GNSS location information if available in the mobile communication device when the measurement was taken, and RF fingerprint information consisting of a PCI/PSC and RSRP/CPICH RSCP for up to 6 intra-frequency neighbor cells if the GNSS location information is not available when the measurement was taken.

Figure 4:
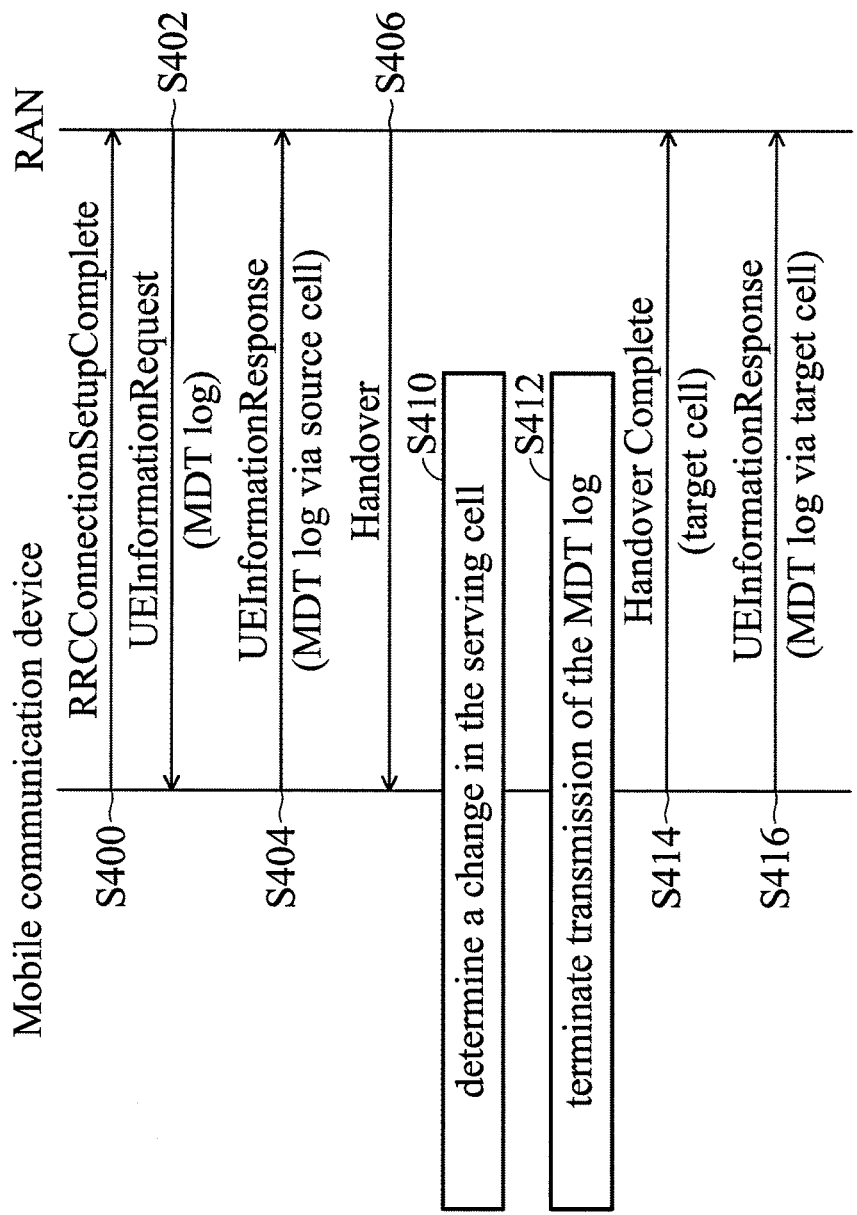
FIG. 4 is a message sequence chart of a Logged MDT reporting method according to an embodiment of the invention.

FIG. 4 is a message sequence chart of a Logged MDT reporting method exchanged between a mobile communication device and a radio access network (RAN) according to an embodiment of the invention. As the mobile communication device enters an RRC CONNECTED state and indicates that a MDT log is available in the RRCConnectionSetupComplete message in a connection establishment procedure (S400), the RAN initiates MDT log retrieval by issuing a request message UEInformationRequest to the mobile communication device (S402). In response to the request message, the communication module 100 (or 200) transmits the collected MDT log in a UEInformationResponse message to the RAN (S404). During transmitting the MDT log to the RAN, the control module 102 (or 202) may continue to log MDT measurement according to Logged MDT configuration. The reporting of the MDT log can occur in a different cell from which the Logged MDT configuration is received. During the transmission of the MDT log, the RAN may determine a necessity for handing over a network service from one cell to another based on a handover measurement report acquired from the mobile communication device. The RAN informs the mobile communication device of the occurrence of the event of the handover of the serving cell by a Handover message (S406). Upon receiving the Handover message the mobile communication device is informed that the serving cell has been changed from the current cell to a target cell (S410), and all ongoing data transmissions are to be transferred to the target cell after the handover procedure. Since the RAN does not receive the MDT log completely before the handover, the control module 102 (or 202) keeps the MDT log in a memory component thereof. The control module 102 (or 202) terminates all ongoing data sessions including the transmission of the MDT log during the handover procedure (S412), and controls the communication module 100 (or 200) to send a Handover Complete message to the target cell to signify the completion of the handover (S414). After the handover, the control module 102 (or 202) controls the communication module 100 (or 200) to continue the transmission of the MDT log by sending a UEInformationResponse message to the RAN via the target cell (S416). The sending of the UEInformationResponse message may be triggered automatically or by a UEInformationRequest message received from the target cell. In one embodiment, the mobile communication device retransmits the entire MDT log to the RAN after the handover. In another embodiment, the mobile communication device resumes the transmission from the previous transmission by transmitting the remaining MDT log that has not yet been transmitted before the handover to the target cell. The RAN may collect and combine all parts of the MDT logs, and make appropriate adjustments to the cells according to the combined MDT log. After the MDT log is received by the RAN, the MDT log retrieval is completed, and the control module 102 (or 202) discards, clears, deletes, removes, or invalidates the MDT log stored therein. Please note that in the UMTS network, the message sequence chart can also be applied the case of SRNS relocation, which also causes a change of the serving cell. In the case of SRNS relocation procedure, the RAN sends a SRNS relocation message instead of Handover message in S408, the mobile communication device replies a SRNS relocation complete message instead of Handover Complete message in S414, and other parts of the message sequence remain similar to FIG. 4.

Figure 5:
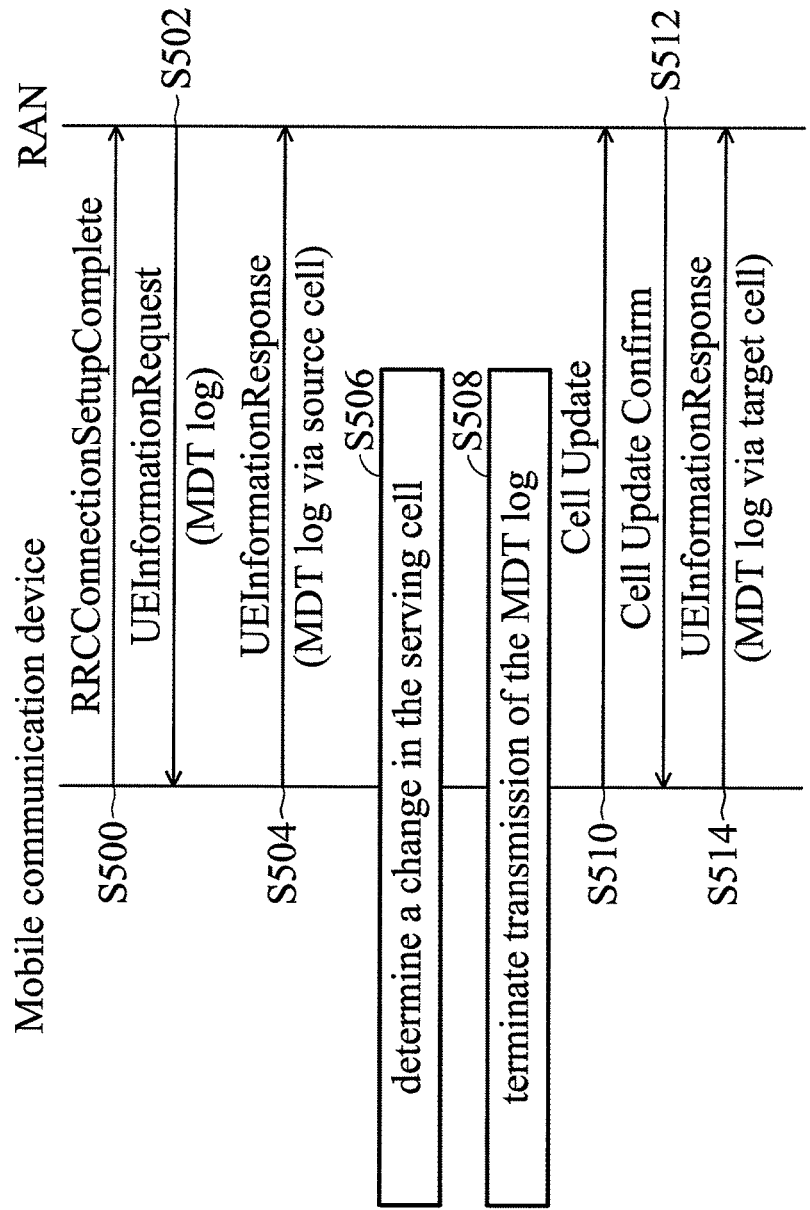
FIG. 5 is a message sequence chart of another Logged MDT reporting method according to an embodiment of the invention.

FIG. 5 is a message sequence chart of another Logged MDT reporting method according to an embodiment of the invention. In FIG. 5, the message sequence S500~S504 is similar to the message sequence S400~404 in FIG. 4, and will not be described again here. During transmission of the MDT log, the mobile communication device may move to another cell in the radio access network. Based on the information broadcasted by the RAN, the control module 102 (or 202) determines that signal quality of the radio signals from the serving cell and neighbor cells and initiates a cell update procedure to change the serving cell from the current cell to a target cell that provides better signal quality (S506). Upon determining that a switch has occurred to another cell as the serving cell, the control module 102 (or 202) terminates all data transmission including the transmission of the MDT log during the cell update procedure (S508) and forwards a Cell Update Request message to the RAN to inform the access network of the change in serving cell (S510). Since the RAN does not receive the MDT log completely before the cell update procedure, the control module 102 (or 202) keeps the MDT log in a memory component thereof. Upon reception of the Cell Update Request message, the RAN registers the changed serving cell and sends a Cell Update Confirm message that may comprise a new Radio Network Temporary Identifier (RNTI) to the mobile communication device (S512) and completes the procedure. After the cell update procedure, the control module 102 (or 202) controls the communication module 100 (or 200) to continue the transmission of the MDT log by sending a UEInformationResponse message to the RAN via the target cell (S514). The sending of the UEInformationResponse message may be triggered automatically or by a UEInformationRequest message received from the new serving cell. In one embodiment, the mobile communication device retransmits the entire MDT log in the memory component after the switch to the target cell. In another embodiment, the mobile communication device resumes the transmission from the previous transmission by transmitting the remaining MDT log that has not yet been transmitted before the switch to the target cell. The RAN may collect and combine all parts of the MDT log, and make appropriate adjustments to the cells according to the combined MDT log. After the MDT log is received by the RAN, the MDT log retrieval is completed, and the control module 102 (or 202) discards, clears, deletes, removes, or invalidates the Logged MDT log stored therein.

Figure 6:
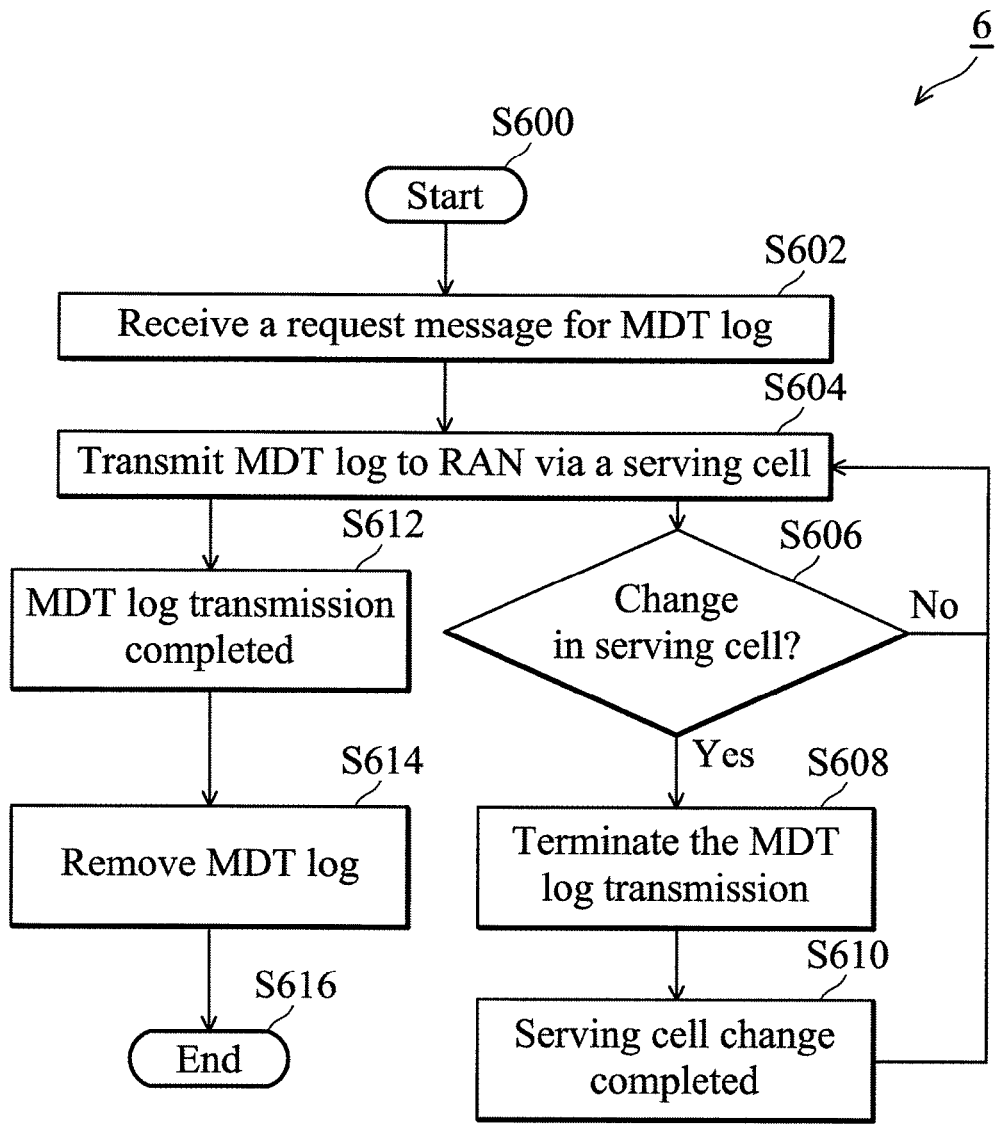
FIG. 6 is a flow chart depicting an MDT log reporting method of a mobile communication device according to an embodiment of the invention.
Figure 7:
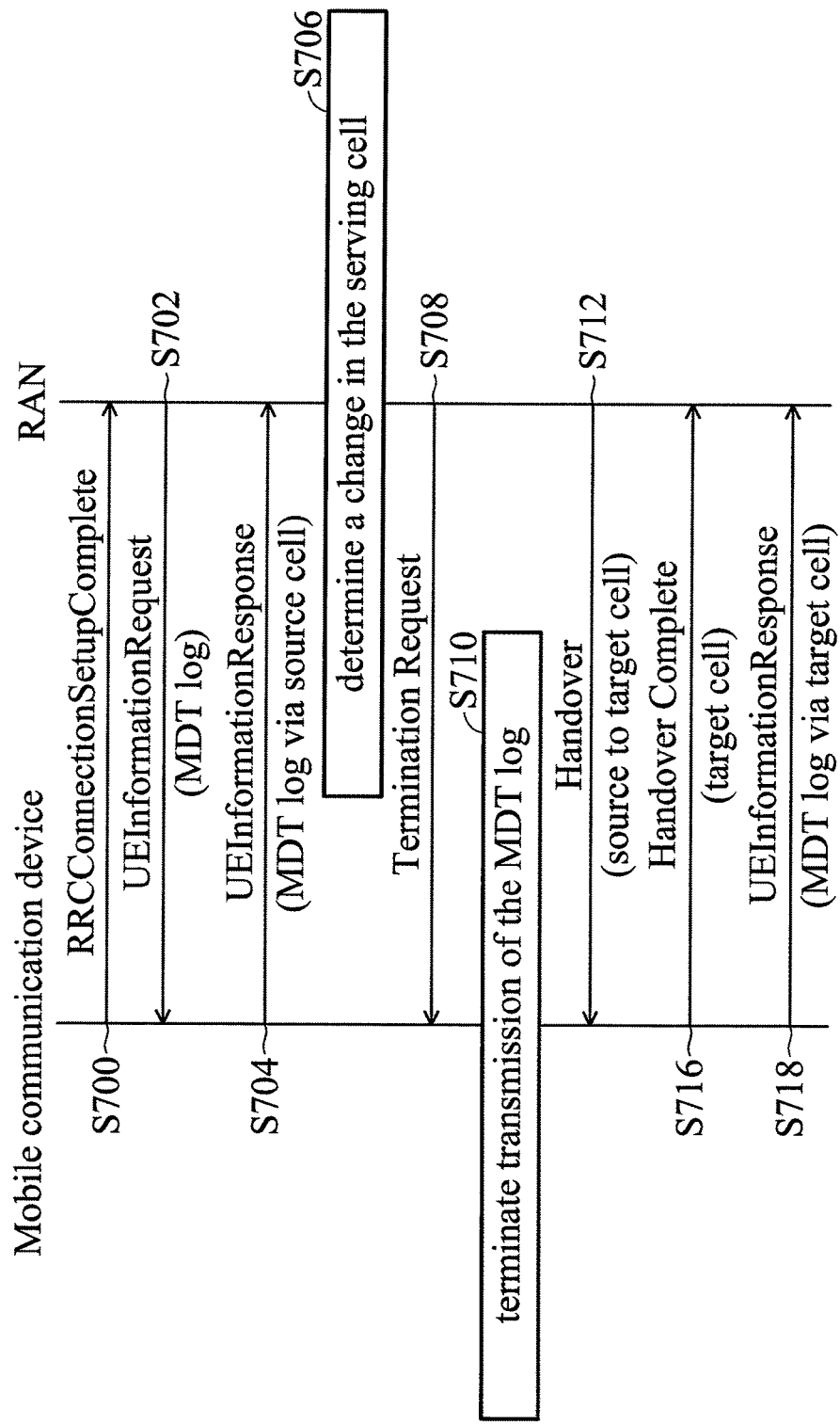
FIG. 7 is a message sequence chart of another Logged MDT reporting method according to an embodiment of the invention.

FIG. 6 is a flow chart depicting a Logged MDT reporting method 6 of a mobile communication device according to an embodiment of the invention. The embodiment of FIG. 6 can be implemented based on the message sequence chart of FIG. 4 or FIG. 5. When entering a RAN, the mobile communication device initiates an RRC connection establishment procedure and indicates availability of MDT log in the RRC signaling RRCConnectionSetupComplete to the RAN (S600), which in turn may initiate MDT log retrieval using a UEInformationRequest message (S602). As a result, the mobile communication device transmits the Logged measurements in a UEInformationResponse message to the RAN via a serving cell through a logical channel or a signaling radio bearer (S604). The logical channel carries Non Access Stratum (NAS) messages that communicate between the mobile communication device and a core network. In one embodiment of the invention, the mobile communication device assigns a higher priority to the NAS messages over the UEInformationResponse message, so that the mobile communication device sends the NAS messages prior to the UEInformationResponse message whenever the NAS message is available. When the NAS message is available during a transmission of the MDT log, the mobile communication device may suspend or stop the transmission of the MDT log, send the NAS message to the core network via the logical channel, then resume the transmission for the remaining MDT log or retransmit the complete MDT log to the RAN. When transmitting the MDT log to the RAN, the mobile communication device may continue to log MDT measurements according to Logged MDT configuration. The reporting of the MDT log can occur in a different cell from which the Logged MDT configuration is received. During the transmission of the MDT log the mobile communication device may have a change in the serving cell from one to another (S606). The serving cell connected to the mobile communication device may be changed due to a handover procedure, an UTRAN SRNS relocation procedure, or a cell update procedure as described above. The change of the serving cell from one cell to another may be initiated by the RAN or the mobile communication device. The mobile communication device terminates all data transmission including the transmission of the MDT log if the change of the serving cell occurs (S608). Since the RAN does not receive the MDT log completely, the mobile communication device keeps the MDT log in a memory component thereof. Upon completion of the serving cell change (S610), the mobile communication device continues the transmission of the MDT log by sending a UEInformationResponse message to the RAN via a new serving cell (S604). The sending of the UEInformationResponse message may be triggered automatically or by a UEInformationRequest message. In one embodiment, the mobile communication device retransmits the entire MDT log. In another embodiment, the mobile communication device resumes the transmission from the previous transmission by transmitting the remaining MDT log that has not yet been transmitted before the change to the new serving cell. The RAN may collect and combine all parts of the MDT log, and make appropriate adjustments to the cells according to the combined MDT log. After the whole MDT log is received by the RAN, the MDT log transmission is completed (S612), and the mobile communication device discards, clears, deletes, removes, or invalidates the MDT log stored therein (S614). The Logged MDT reporting method 6 is completed and exited FIG. 7 is a message sequence chart of another Logged MDT reporting method according to an embodiment of the invention. In FIG. 7, the message sequence S700~S704 is similar to the message sequence S400~404 in FIG. 4, and will not be described again here. During transmission of the MDT log, the RAN determines a handover of a network service from one cell to another based on a handover measurement report acquired from the mobile communication device (S706), and initiates a Termination Request message terminating the ongoing MDT log transmission to the mobile communication device (S708). Upon reception of the Termination Request message, the control module 102 (or 202) terminates the transmission of the MDT log accordingly (S710). The RAN then informs the mobile communication device of the occurrence of the event of the handover of the serving cell by a Handover message (S712). The message sequence S716~S718 is similar to the message sequence S414~416 in FIG. 4, and will not be described again here.

Figure 8:
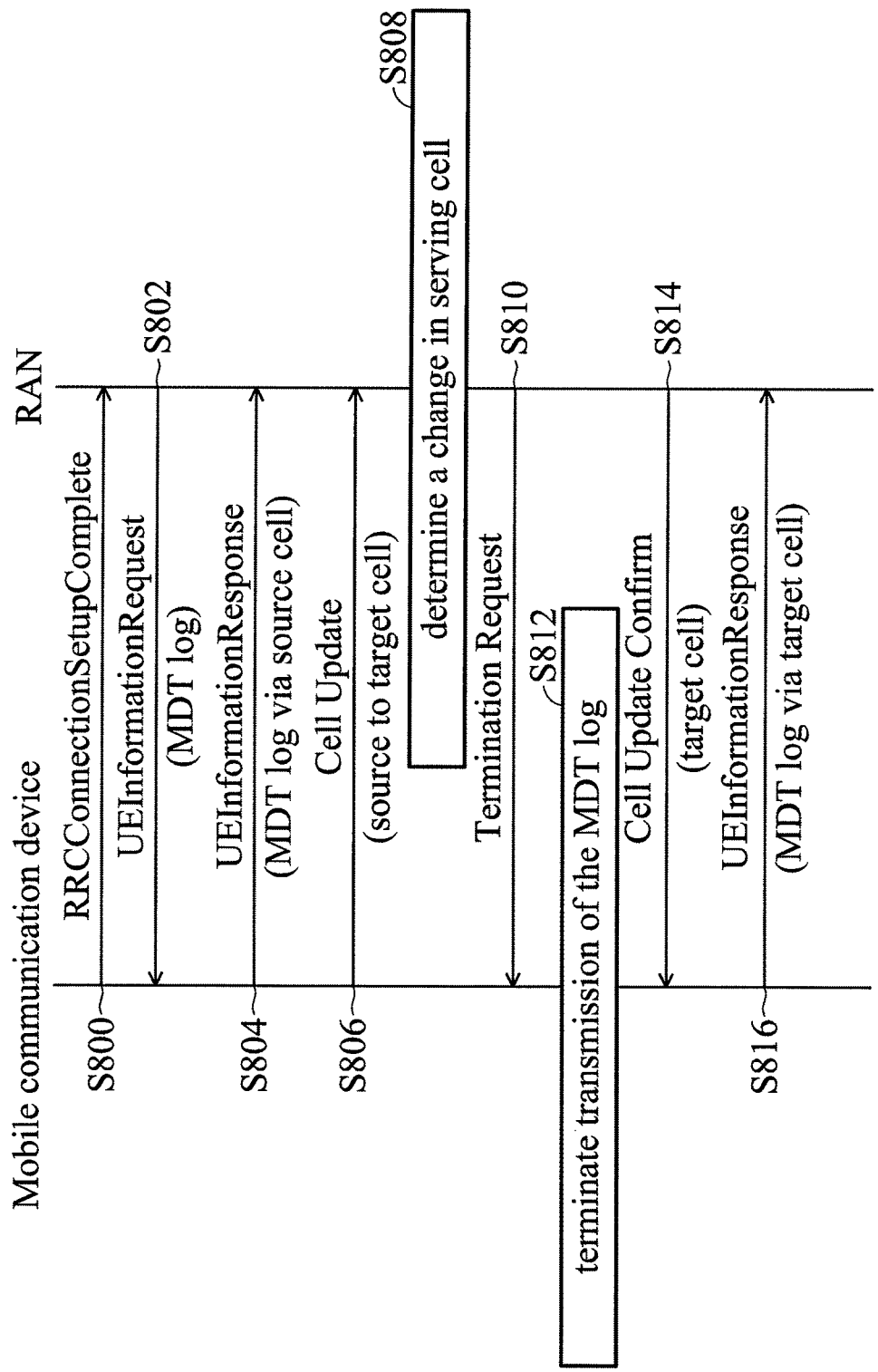
FIG. 8 is a message sequence chart of another Logged MDT reporting method according to an embodiment of the invention.

FIG. 8 is a message sequence chart of another Logged MDT reporting method according to an embodiment of the invention. In FIG. 8, the message sequence S800~S804 is similar to the message sequence S500~504 in FIG. 5, and will not be described again here. During the transmission of the MDT log, the mobile communication device may move to another cell in the radio access network (RAN). Based on the information broadcasted by the RAN, the control module 102 (or 202) determines the signal quality of the radio signals from the serving cell and neighbor cells and initiates a cell update procedure to change the serving cell from the current cell to a target cell that provides better signal quality by issuing a Cell Update Request message (S806). The RAN is informed of the change in the serving cell after receiving the Cell Update Request message (S808), and initiates a Termination Request message terminating the ongoing MDT log transmission to the mobile communication device accordingly (S810). Upon reception of the Termination Request message, the control module 102 (or 202) responds by terminating the transmission of the MDT log (S812). The message sequence S814~S816 is similar to the message sequence S512~514 in FIG. 5, and will not be described again here.

Figure 9:
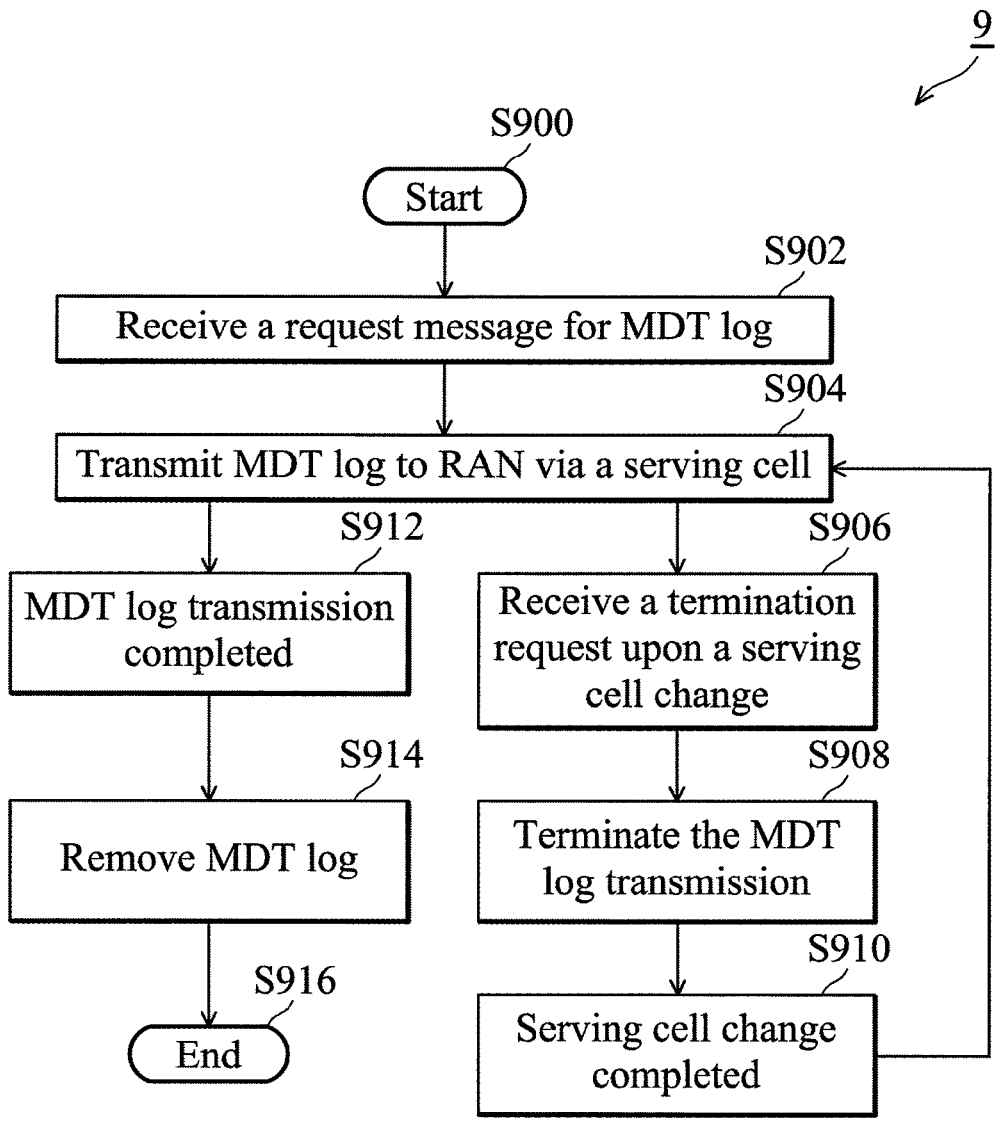
FIG. 9 is a flow chart illustrating an MDT log reporting method of a mobile communication device according to an embodiment of the invention.

FIG. 9 is a flow chart illustrating an MDT log reporting method of a mobile communication device according to an embodiment of the invention. The embodiment of FIG. 9 can be implemented based on the message sequence chart of FIG. 7 or FIG. 8. The flow chart of FIG. 9 is similar to that of FIG. 6, except that the mobile communication device terminates the MDT log transmission (S910) in response to receiving a termination request message from the RAN (S906) instead of detecting a change of the serving cell as in S606 of FIG. Other steps in FIG. 9 can be found corresponding steps in FIG. 6, and will not be described again here.

Figure 10:
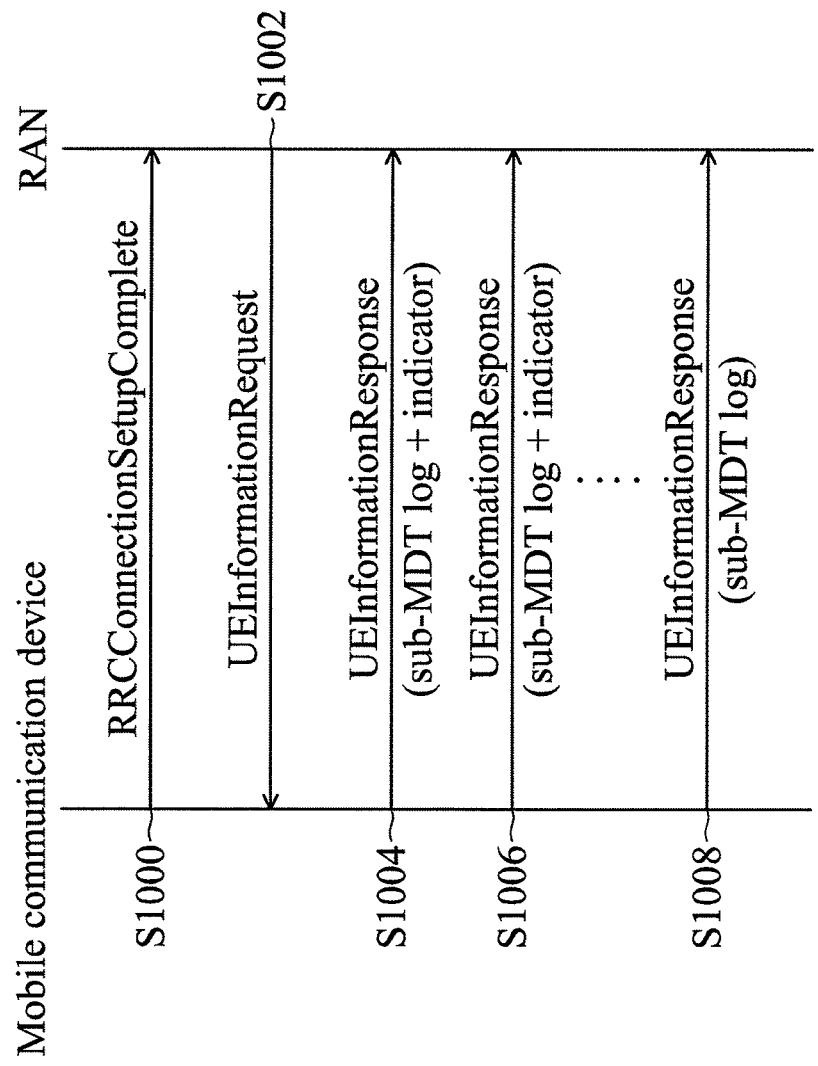
FIG. 10 is a message sequence chart of another Logged MDT reporting method according to an embodiment of the invention.

FIG. 10 is a message sequence chart of another Logged MDT reporting method according to an embodiment of the invention. Similar to the message sequence chart in FIG. 4, the mobile communication device indicates the availability of the MDT log in the RRC signaling RRCConnectionSetupComplete to the RAN (S1000), which in turn may initiate the MDT log reporting using a UEInformationRequest message (S1002). The control module 102 (or 202) divides the complete MDT log into a plurality of parts (each part of the MDT log is referred as a sub-MDT log below), and includes each sub-MDT log in a UEInformationResponse message (or other applicable RRC message) to be transmitted to the RAN via a serving cell through a logical channel in a consecutive order (S1004~S1008). The communication module 100 (or 200) continues transmitting the UEInformationResponse message until no more sub-MDT log is available. The control module 102 (or 202) may discard, clear, delete, remove, or invalidate each sub-MDT log as the transmission thereof is completed successfully. Each UEInformationResponse message (or other applicable RRC message) comprises a sub-MDT log and also indicates whether the MDT log reporting is finished or whether at least one more sub-MDT log is available. The size of the sub-MDT log may be a predetermined fixed data size or adaptable according to a maximum lower layer message size such as a maximum PDCP PDU size. The UEInformationResponse message may comprise an indicator for explicitly indicating whether the MDT log reporting is finished or whether at least one more sub-MDT log is available. In the embodiment of FIG. 10, when the sub-MDT log included in the UEInformationResponse message is not the last sub-MDT log of the MDT log, the UEInformationResponse message comprises an indicator for indicating that the MDT log reporting is not finished or at least one more sub-MDT log is available (S1004, S1006); on the other hand, when the sub-MDT log included in the UEInformationResponse message is the last sub-MDT log, the UEInformationResponse message indicates that the MDT log reporting is finished or no more sub-MDT log is available by not comprising the indicator (S1008).

Figure 11:
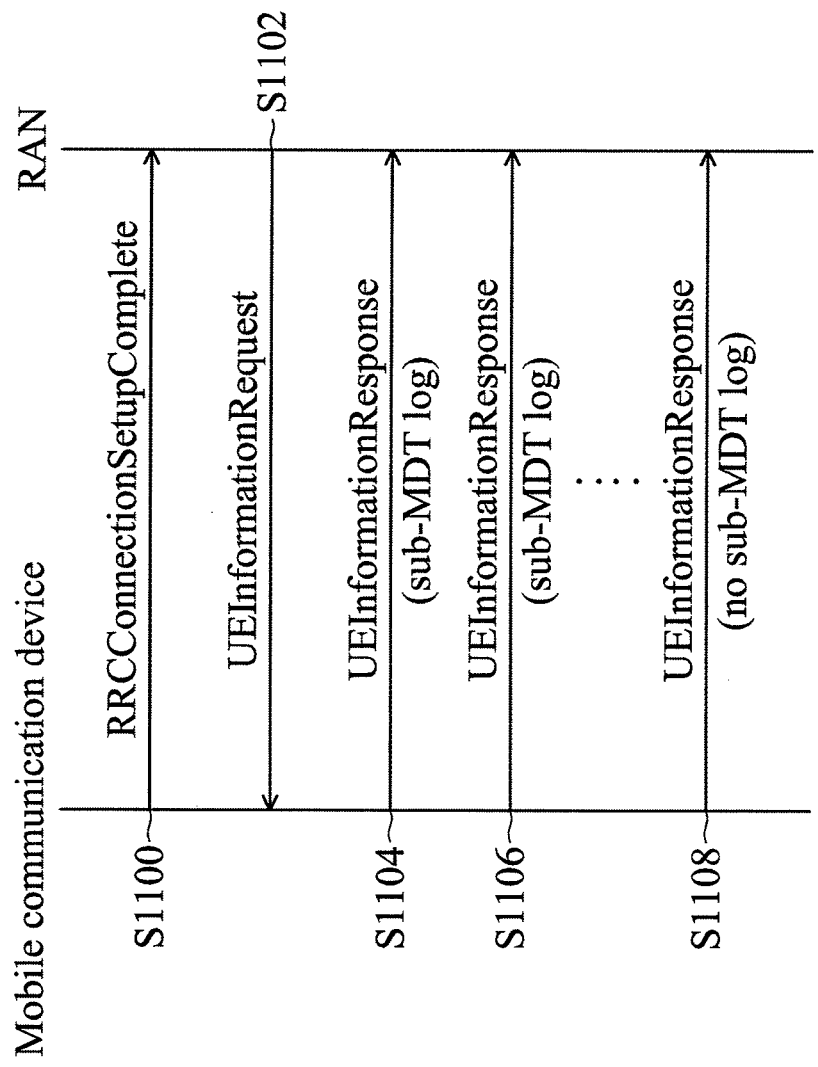
FIG. 11 is a message sequence chart of another Logged MDT reporting method according to an embodiment of the invention.

FIG. 11 is a message sequence chart of another Logged MDT reporting method according to an embodiment of the invention. The message sequence S1100~S1108 in FIG. 11 is similar to the message sequence S1000~S1008 in FIG. 10, except the manner in which the UEInformationResponse message (or other applicable RRC message) indicates whether the MDT log reporting is finished or whether at least one more sub-MDT log is available. In the embodiment of FIG. 11, the UEInformationResponse message generated by the control module 102 (or 202) implicitly indicates that the MDT log reporting is not finished or at least one more sub-MDT log is available just by comprising a sub-MDT log (S1104, S1106), i.e. no explicit indicator is needed; on the other hand, the UEInformationResponse message implicitly indicates that the MDT log reporting is finished or no more sub-MDT log is available just by comprising no sub-MDT log (S1108), i.e. no explicit indicator is needed.

Figure 12:
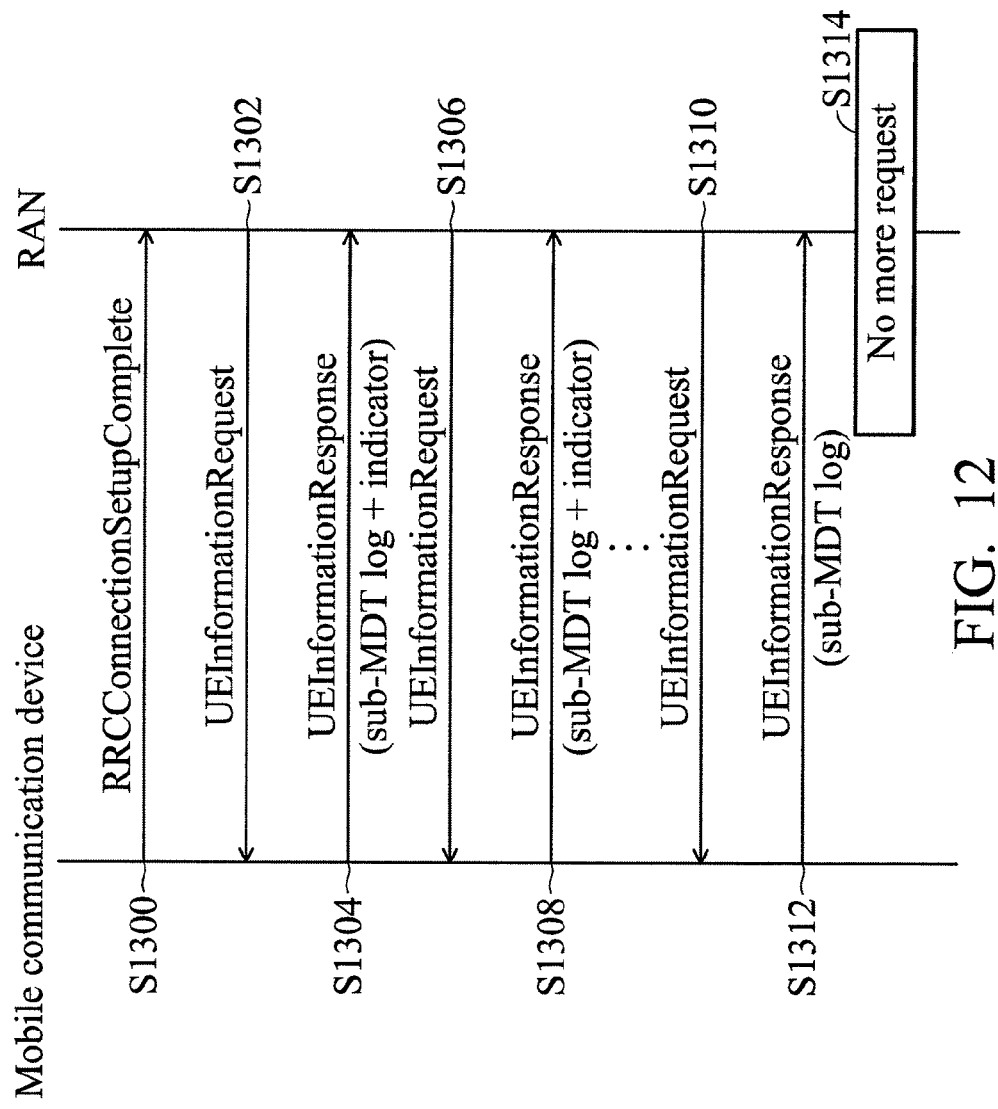
FIG. 12 is a message sequence chart of another Logged MDT reporting method according to an embodiment of the invention.

FIG. 12 is a message sequence chart of another Logged MDT reporting method according to an embodiment of the invention. FIG. 12 is similar to FIG. 10, except that the mobile communication device sends out each UEInformationResponse message in response to receiving an UEInformationRequest message from the RAN. Thus, when receiving a UEInformationRequest message from the RAN, the mobile communication device replies a UEInformationResponse message to the RAN (S1304, S1308, S1312). The RAN determines whether to send the next UEInformationRequest message based on the indication of the UEInformationResponse message received from the mobile communication device. When the received UEInformationResponse message contains an indicator indicating that the MDT log reporting is not finished or at least one more sub-MDT log is available, the RAN sends the next UEInformationRequest message to continue the MDT log reporting process or to request for another sub-MDT log (S1306, S1310). When the received UEInformationResponse message does not contain the above indicator, the RAN ceases to send any UEInformationRequest message (S1312) and the MDT log reporting method is completed.

Figure 13:
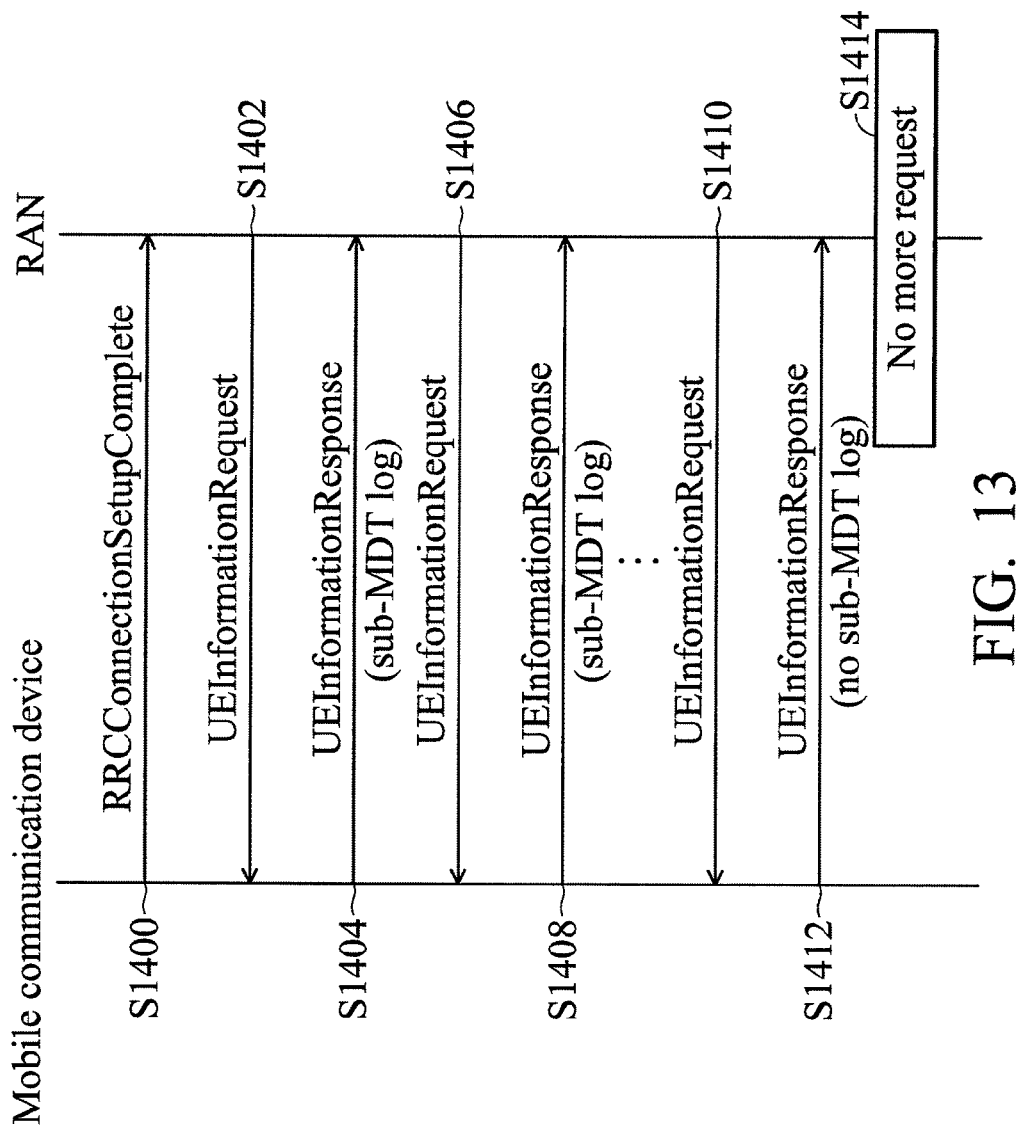
FIG. 13 is a message sequence chart of another Logged MDT reporting method according to an embodiment of the invention.

FIG. 13 is a message sequence chart of another Logged MDT reporting method according to an embodiment of the invention. FIG. 13 is similar to FIG. 11, except that the mobile communication device sends out each UEInformationResponse message in response to receiving an UEInformationRequest message from the RAN. Thus, when receiving a UEInformationRequest message from the RAN, the mobile communication device replies a UEInformationResponse message to the RAN (S1404, S1408, S1412). The RAN determines whether to send the next UEInformationRequest message based on the indication of the UEInformationResponse message received from the mobile communication device. When the received UEInformationResponse message comprises a sub-MDT log and no explicit indicator (i.e. indicating that the MDT log reporting is not finished or at least one more sub-MDT log is available), the RAN sends the next UEInformationRequest message to continue the MDT log reporting process or to request for another sub-MDT log (S1406, S1410). When the received UEInformationResponse message comprises no sub-MDT log (i.e. indicating that the MDT log reporting is finished or no more sub-MDT log is available), the RAN ceases to send any UEInformationRequest message (S1412) and the MDT log reporting method is completed.

In each embodiment of FIGS. 10, 11, 12 and 13, the logical channel for transmitting the UEInformationResponse message may carry Non Access Stratum (NAS) messages that communicate between the mobile communication device and the core network. In one embodiment of the invention, the control module 102 (or 202) assigns a higher priority to the NAS messages over the RRC message including the sub-MDT log, so that the communication module 100 (or 200) sends the NAS messages prior to the RRC message including the sub-MDT log whenever the NAS message is available. When no NAS message is required to be transmitted, the control module 102 (or 202) resumes the transmission for the next UEInformationResponse message transmission until the entire MDT log transmission is completed.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a network server, requesting a Minimization of Drive Test (MDT) log from a mobile communication device, comprising:
    transmitting a first request message for the MDT log to the mobile communication device;
    in response to the first request message, receiving a first response message comprising a part of the MDT log from the mobile communication device, wherein the first response message indicates whether the MDT log reporting is finished or whether at least one more part of the MDT log is available; and
    transmitting a second request message for the MDT log to the mobile communication device when the first response message indicates that the MDT log reporting is not finished or at least one more part of the MDT log is available.

2. The method of claim 1, wherein the first response message comprises an indicator for indicating whether the MDT log reporting is finished or whether at least one more part of the MDT log is available.

3. The method of claim 1, wherein when the part of the MDT log included in the first response message is not a last part of the MDT log, the first response message comprises an indicator for indicating that the MDT log reporting is not finished or at least one more part of the MDT log is available.

4. The method of claim 3, wherein when the part of the MDT log included in the first response message is a last part of the MDT log, the first response message indicates that the MDT log reporting is finished or no more part of the MDT log is available by not comprising the indicator.

5. The method of claim 1, wherein the first response message indicates the MDT log reporting is not finished or at least one more part of the MDT log is available just by comprising the part of the MDT log.

6. The method of claim 5, further comprising:
    in response to the second request message, receiving a second response message from the mobile communication device;
    wherein when the part of the MDT log included in the first response message is not a last part of the MDT log, the second response message comprises another part of the MDT log.

7. A network server, requesting a Minimization of Drive Test (MDT) log from a mobile communication device, comprising:
    a transceiver, configured to transmit a first request message for the MDT log to the mobile communication device; and in response to the first request message, receive a first response message comprising a part of the MDT log from the mobile communication device, wherein the first response message indicates whether the MDT log reporting is finished or whether at least one more part of the MDT log is available; and
    wherein the transceiver is further configured to transmit a second request message for the MDT log to the mobile communication device when the first response message indicates that the MDT log reporting is not finished or at least one more part of the MDT log is available.

8. The network server of claim 7, wherein the first response message comprises an indicator for indicating whether the MDT log reporting is finished or whether at least one more part of the MDT log is available.

9. The network server of claim 7, wherein when the part of the MDT log included in the first response message is not a last part of the MDT log, the first response message comprises an indicator for indicating that the MDT log reporting is not finished or at least one more part of the MDT log is available.

10. The network server of claim 9, wherein when the part of the MDT log included in the first response message is a last part of the MDT log, the first response message indicates that the MDT log reporting is finished or no more part of the MDT log is available by not comprising the indicator.

11. The network server of claim 7, wherein the first response message indicates the MDT log reporting is not finished or at least one more part of the MDT log is available just by comprising the part of the MDT log.

12. The network server of claim 11 wherein:
    in response to the second request message, the transceiver is further configured to receive a second response message from the mobile communication device; and
    when the part of the MDT log included in the first response message is not a last part of the MDT log, the second response message comprises another part of the MDT log.

13. A mobile communication device, providing a MDT log to a network server, comprising:
    a transceiver, configured to receive a first request message for the MDT log from the network server; and in response to the first request message, transmit a first response message comprising a part of the MDT log to the network server, wherein the first response message indicates whether the MDT log reporting is finished or whether at least one more part of the MDT log is available; and
    wherein the transceiver is further configured to receive a second request message for the MDT log from the network server when the first response message indicates that the MDT log reporting is not finished or at least one more part of the MDT log is available.

14. The mobile communication device of claim 13, wherein the first response message comprises an indicator for indicating whether the MDT log reporting is finished or whether at least one more part of the MDT log is available.

15. The mobile communication device of claim 13, wherein when the part of the MDT log included in the first response message is not a last part of the MDT log, the first response message comprises an indicator for indicating that the MDT log reporting is not finished or at least one more part of the MDT log is available.

16. The mobile communication device of claim 15, wherein when the part of the MDT log included in the first response message is a last part of the MDT log, the first response message indicates that the MDT log reporting is finished or no more part of the MDT log is available by not comprising the indicator.

17. The mobile communication device of claim 13, wherein the first response message indicates the MDT log reporting is not finished or at least one more part of the MDT log is available just by comprising the part of the MDT log.

18. The mobile communication device of claim 17, wherein:
    in response to the second request message, the transceiver is further configured to transmit a second response message to the network server; and
    when the part of the MDT log included in the first response message is not a last part of the MDT log, the second response message comprises another part of the MDT log.

19. The mobile communication device of claim 13, further comprising:
    a controller, configured to remove or invalidate the part of the MDT log after the first response message is transmitted.

* * * * *